United States Patent Office 3,829,462
Patented Aug. 13, 1974

3,829,462
ANTHRANILIC ACID ESTERS NUCLEARLY SUBSTITUTED WITH OPTIONALLY SUBSTITUTED PHENYL-ALKYL
Heinrich Krimm and Dieter Freitag, Krefeld-Bockum, and Immo Boie, Cologne, Germany, assignors to Farbenfabriken Bayer Aktiengesellschaft, Leverkusen, Germany
No Drawing. Filed Jan. 28, 1971, Ser. No. 110,776
Claims priority, application Germany, Jan. 28, 1970, P 20 03 707.4; Dec. 29, 1970, P 20 64 305.4
Int. Cl. C07c 101/54
U.S. Cl. 260—471 R                9 Claims

ABSTRACT OF THE DISCLOSURE

The invention relates to anthranilic acid esters which are alkylated in the nucleus represented by the general formula

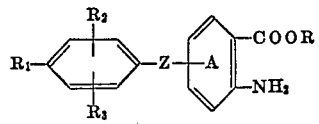

and to a process for their preparation. R, $R_1$, $R_2$, $R_3$ and Z have the meaning as indicated in the specification.

The anthranilic acid esters according to this invention are suitable for the stabilisation of viscosity in the production of polyamides and they are also suitable for the production of azo dyes and indazolones which can be used as color forming couplers.

Such anthranilic acid esters which have groups able for condensation or additional reactions are suitable for the production of high molecular weight compounds.

---

The invention relates to anthranilic acid esters which are alkylated in the nucleus and to a process for their preparation.

The reaction of formaldehyde with anthranilic acid via the intermediate stage of the compound which is alkylated on the nitrogen atom to form 5,5′-methylene-bis-anthranilic acid is already known.

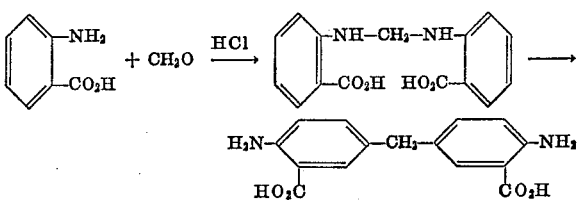

According to German Patent Specification No. 930,409, it is recommended to use an excess of hydrochloric acid, based on the amount of anthranilic acid used, and a reaction temperature of about 50 to 60° C. in order to obtain high yields of 5,5′-methylene-bis-anthranilic acid.

Under these conditions, anthranilic acid can only be alkylated on the carbon with the highly reactive formaldehyde but not with olefines or tertiary alcohols since the aromatic nucleus of anthranilic acid is powerfully inactivated by the carboxyl group. Therefore, in spite of the reaction temperature of 140 to 150° C., which is higher than that used in the reaction with formaldehyde, the product obtained from 1,2-dibromo ethane or 1,3-dibromopropane and the methyl ester of anthranilic acid is only a N,N′-alkylation product and the molecular arrangement desired does not take place [Rec. Trav. Chim., 61, 486 and 494 (1942)].

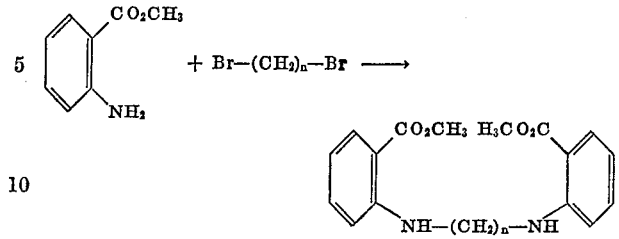

$n=2,3$.

According to the state of the art, therefore, it was not predictable that an anthranilic acid ester whose reactivity with aromatic amines was greatly reduced would undergo C-alkylation with isopropyl- or diisopropylbenzene derivatives.

It is an object of this invention to avoid the above-mentioned disadvantages.

This object is accomplished by a process for the production of anthranilic acid esters which are alkylated in the nucleus wherein an anthranilic acid ester of the general formula

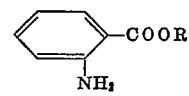

wherein
R represents alkyl ($C_1$–$C_4$) or phenyl
is reacted with a compound of the general formula

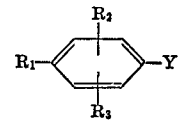

wherein
Y represents α-hydroxyisopropyl, isopropenyl, α-haloisopropyl, α-alkoxyisopropyl,

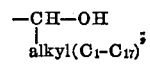

cycloalkenyl or

and R″ represents hydrogen, alkyl ($C_1$–$C_{17}$) or aryl,
$R_1$ represents hydrogen, methyl, isopropyl, halogen, OH, alkoxy ($C_1$–$C_{18}$), NH-CO-alkyl ($C_1$–$C_{17}$), isopropenyl, α-hydroxyisopropyl, α-haloisopropyl, α-alkoxyisopropyl, and
$R_2$ and $R_3$ which are in o- or m-position to $R_1$ and which are different represent hydrogen, alkyl ($C_1$–$C_{18}$), alkoxy or halogen with the proviso that provided $R_1$ represents α-hydroxyisopropyl, isopropenyl, α-haloisopropyl or α-alkoxyisopropyl attached in m- or p-position to Y, $R_2$ and $R_3$ represent hydrogen, in the presence of aluminas which are activated with mineral acids at a temperature of 100 to 235° C.

Another object of this invention are anthranilic acid esters which are alkylated in the nucleus, represented by the general formula

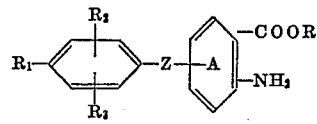

in which

R represents $C_1-C_4$-alkyl or phenyl,
$R_1$ represents hydrogen, OH, alkoxy-$(C_1-C_{18})$ or NH-CO-alkyl $(C_1-C_{17})$,
$R_2$ and $R_3$ which are the same or different and which are in the o- or m-position to R, represent hydrogen alkyl $(C_1-C_{18})$, alkoxy $(C_1-C_{18})$, halogen,
Z which is in o- or p-position to the amino group of nucleus A, represents the group $$-\overset{R_4}{\underset{R_5}{C}}-$$

wherein $R_4$ represents alkyl $(C_1-C_{18})$ and
$R_5$ represents hydrogen, alkyl $(C_1-C_4)$ or aryl or $R_4$ and $R_5$ together with the C-atom to which they are attached, represent a 5- or 6-membered cycloaliphatic system, and wherein provided that $R_4$ and $R_5$ are $CH_3$, $R_1$ cannot be hydrogen or OH.

Another object of this invention are anthranilic acid esters which are alkylated in the nucleus represented by the general formula in which R represents alkyl $(C_1-C_4)$ or phenyl,
$R_1$ represents alkoxy $(C_1-C_{18})$ or NH-CO-alkyl $(C_1-C_{17})$, and
$R_2$ represents hydrogen, alkyl $(C_1-C_{18})$, alkoxy $(C_1-C_{18})$ or halogen, and such of the general formula in which R represents alkyl $(C_1-C_4)$ or phenyl,
$R_1$ represents hydrogen or OH, and
Z represents the group $$-\overset{R_4}{\underset{R_5}{C}}-$$

wherein $R_4$ represents alkyl $(C_1-C_{18})$ and
$R_5$ represents hydrogen, alkyl $(C_1-C_4)$ or aryl or $R_4$ and $R_5$ together with the C-atom to which they are attached, represent a 5- or 6-membered cycloaliphatic system, and wherein $R_4$ and $R_5$ cannot both be $CH_3$.

Another object of this invention are anthranilic acid esters alkylated in the nucleus represented by the general formula in which R' represents hydrogen, OH, Cl, Br, methyl isopropyl or R represents alkyl $(C_1-C_4)$ or phenyl, and R' and the isopropylidene group are in the m- or p-position to each other and each isopropylidene group is linked to the nucleus A in the o- or p-position to the amino group.

Alkylating agents which are suitable for the process according to the invention are diisopropenylbenzenes such as m- and p-diisopropenylbenzene, $\alpha,\alpha'$-dihydroxy-diisopropyl benzenes such as $\alpha,\alpha'$-dihydroxy-m- and $\alpha,\alpha'$-dihydroxy-p-diisopropylbenzene, $\alpha$-hydroxyisopropyl - isopropenylbenzenes (preparation according to Belgian Patent Specification No. 717,313) such as $\alpha$-hydroxyisopropyl - p - isopropenylbenzene, $\alpha,\alpha'$-dialkoxy-diisopropylbenzenes such as $\alpha,\alpha'$-dimethoxy-p-diisopropylbenzene, $\alpha,\alpha'$-dihalo-diisopropylbenzenes such as $\alpha,\alpha'$-dichloro-m-diisopropylbenzene, isopropenylbenzenes such as isopropenylbenzene, a methyl styrene, p-hydroxy-, p-chloro-, p-bromo-, p-methyl- and p-isopropyl-isopropenylbenzene, N-(p-isopropenyl-phenyl) - stearyl amide, N-(p-isopropenyl-o-methoxy-phenyl)-stearyl amide, N - (p-isopropenyl-o-chloro-phenyl) - stearyl amide, N-(p-isopropenyl-o-bromophenyl)-stearyl amide—the stearyl amides, which can be prepared from the corresponding p-amino-isopropylbenzene derivatives (preparation according to German Patent 1,191,363)—and $\alpha$-hydroxy-isopropylbenzenes such as $\alpha$-hydroxy-isopropylbenzene, $\alpha$-hydroxy-p-chloroisopropylbenzene, $\alpha$ - hydroxy-p-bromo-isopropylbenzene, $\alpha$-hydroxy-p-methyl - isopropylbenzene, $\alpha$-hydroxy-p-isopropyl-isopropylbenzene and mixtures of any of these compounds.

Further alkylating agents which are suitable for the process according to the invention are styrene, 2-(p-hydroxyphenyl)-2-butene, 2 - (p-hydroxyphenyl)-2-pentene, $\alpha$-(p - hydroxyphenyl)-styrene, 1-(p-hydroxyphenyl)-1-isobutene, p-cyclohexenylphenol (preparation according to German Auslegeschrift 1,235,894), p-dodecyloxy-isopropenylbenzene, p-tetra-decyloxy-isopropenylbenzene, p-cetoxy-isopropenylbenzene, dimeric p-cetoxy-isopropenylbenzene and mixtures of any of these compounds.

Suitable anthranilic acid esters are 2-aminobenzoic acid esters which have a free ortho- or para-position, such as methyl, ethyl, propyl, butyl, isobutyl, isoamyl and phenyl esters of anthranilic acid and mixtures of these compounds.

The molar ratio of the alkylating agent to the anthranilic acid ester is advantageously from 1:3 to about 1:10 but ratios above or below these values may also be used.

Suitable catalysts are acids such as hydrochloric acid, sulphuric acid, phosphoric acid and p-toluenesulphonic acid. Preferably, argillaceous earths such as bentonites, zeolites and montmorillonites which have been additionally activated with mineral acids are used as acid catalyst. The quantity of the catalyst may amount to from 0.5 to 10% by weight of the reaction mixture.

Alkylation may be carried out in bulk or in a solvent. The latter is advisable if the water of reaction produced in the reaction of $\alpha,\alpha'$-dihydroxy-diisopropylbenzenes must be removed, which can easily be effected by azeotropic distillation. Suitable solvents are hydrocarbons which are inert under the reaction conditions, such as toluene, xylenes and o-, m- and p-dichlorobenzenes.

The reaction temperature is from about 100–235° C., preferably from about 140–190° C.

When reacting $\alpha,\alpha'$-dihydroxy-diisopropylbenzenes, the reaction time can very easily be determined by the quantity of water separated. When using diisopropylbenzenes, the first mentioned time may be chosen. The reaction times vary between a few minutes and several hours.

The alkylation may be carried out intermittently or continuously. The continuous process is suitable on account of the use of argillaceous earths as catalysts.

Working up the product is a very simple procedure. When te catalyst has been removed, the solvent and part of the excess anthranilic acid ester are evaporated from the reaction mixture under vacuum and the residue is then digested with ligroin, removed by suction filtration and recrystallised.

The yields of anthranilic acid esters alkylated in the nucleus depend on the nature of the reactants but are generally from about 70% and about 90% of the theoretical yield.

The anthranilic acid esters according to this invention are suitable for the stabilisation of viscosity in the production of polyamides and they are also suitable for the production of azo dyes and indazolones, which can be used as color forming couplers. In case, the products according to the invention are used as viscosity stabilisers in polyamide production, simultaneously, the dyeability of the polyamides is considerably improved. If oxyethylated, the anthranilic acid esters which are substituted in the nucleus have remarkable antistatic properties.

The bisanthranilic acid esters can be reacted in the conventional manner with any aromatic dicarboxylic acid dihalides, such as isophthaloyl chloride or terephthaloyl chloride, to yield polyamidocarboxylic acid esters which are readily soluble in chloroform. In this respect they differ substantially from known bisanthranilic acids which yield polyamidocarboxylic acids J. Polymer Sci., A–1, 5, 2359 et seq. (1967)) which can only be dissolved in a large excess of expensive and difficultly volatile solvents such as N-methylpyrrolidone and worked up from them.

Cyclisation of polyaminocarboxylic acid esters prepared from bisanthranilic acid esters to yield polybenzoxazinones is carried out by conventional processes.

The bi-nuclear anthranilic acid esters which in o- or p-position to the group Z have a group which is able for condensation or addition reactions (e.g. OH) are suitable similarly to the tri-nuclear bis-anthranilic acid esters for the production of high molecular weight compounds.

Preparation of the starting materials:

(1) Step of reaction according to German Pat. 1,217,971:

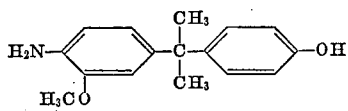

2-(p-hydroxy-phenyl)-2-(m-methoxy-p-aminophenyl)propane 1.23 kg. of o-anisidine, 134 g. of dimeric p-isopropenyl-phenol, 200 ml. of xylene and 20 g. of montmorillonite catalyst ("K 20," Südchemie, Munich) are heated under reflux for 7.5 hours. After removal of the catalyst by suction filtration and after removal of xylene by evaporation the residue is recrystallised from benzene.

149 g. (amounting to 58% of the theoretical quantity) of light yellow crystals of melting point 156° C. to 157° C. are obtained.

Analysis: $C_{16}H_{19}NO_2$ (257.32). Calculated: N, 5.44. Found: N, 5.49–5.51.

(2) Step of reaction according to German Pat. 1,191,363:

(a)

(a)

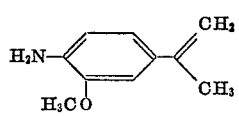

o-methoxy-p-isopropenyl-aniline 138 g. of 2 - (p - hydroxyphenyl) - 2 - (m - methoxy - p-aminophenyl)-propane and 4 g. of $Ca(OH)_2$ are melted on under a nitrogen atmosphere and distilled under high vacuum into a cooled receiver containing 0.7 l. of 4 n NaOH and 300 ml. toluene.

| Period of time | hours | 4.5 |
|---|---|---|
| Temperature of heating bath | ° C | 203–232 |
| Internal temperature | ° C | 190–218 |
| Temperature of distillate | ° C | 92–168 |
| Pressure | torr | 0.4 |

Residue, 17 g. of a resin in the distilling flask.

After separating the layers and after neutralising and evaporating the toluene layer, 49 g. of a yellowish liquid which boils at a temperature of 95–98° C. under a pressure of 0.07 torr are obtained, amounting to 56% of the theoretical quantity of (b)

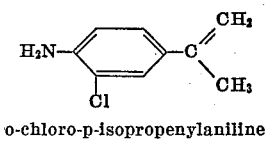

o-chloro-p-isopropenylaniline

The IR spectrum confirms the structure.

151 g. of 2 - (p - hydroxyphenyl) - 2 - (m - chloro - p-aminophenyl)propane (prepared according to German Pat. No. 1,279,971) and 4 g. of $Ca(OH)_2$ are melted under a nitrogen atmosphere and distilled under high vacuum into a cooled receiver containing 0.7 l. of 4 n NaOH and 300 ml. of toluene.

| Period of time | hours | 8 |
|---|---|---|
| Temperature of heating bath | ° C | 185–220 |
| Internal temperature | ° C | 174–202 |
| Temperature of distillate | ° C | 76–180 |
| Pressure | torr | 0.5–1.4 |

Residue: 14 g. of a resin in the distilling flask.

After separating the layers and after neutralizing and evaporating the toluene layer, 62 g. of a colorless liquid, which boils at a temperature of 76–80° C. under a pressure of 0.07 torr, are obtained.

Analysis: $C_6H_{10}ClN$. Calculated: N, 8.36. Found: N, 8.22 to 8.43.

(3) Step of reaction: General method of preparation of compounds having the general formula

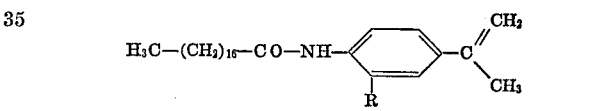

R=H, $CH_3$, $OCH_3$, Cl according to the prior art.

0.3 mol of the isopropenyl aniline (prepared according to the above-mentioned second step of the reaction) are dissolved in 400 ml. methylene chloride. 14 g. of NaOH dissolved in 350 ml. of water are added to the methylene chloride solution. After that 95.75 g. of stearic acid chloride are dropped in and a colorless solid is precipitated. After recrystallisation from ethanol colorless crystalls are obtained.

| R | Yield, percent | Melting point (° C.) | Analysis | Calculated, N | Found, N |
|---|---|---|---|---|---|
| H | 96.5 | 108–109 | $C_{27}H_{45}NO$ | 3.51 | 3.65–3.71 |
| $CH_3$ | 100 | 91–94 | $C_{28}H_{47}NO$ | 3.39 | 3.04–3.22 |
| $OCH_3$ | 73 | 71–72 | $C_{28}H_{47}NO_2$ | 3.26 | 3.13–3.39 |
| Cl | 100 | 80 | $C_{27}H_{44}ClNO$ | 3.11 | 3.17–3.40 |

EXAMPLE 1

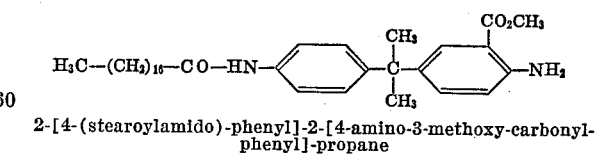

2-[4-(stearoylamido)-phenyl]-2-[4-amino-3-methoxy-carbonyl-phenyl]-propane 59.94 g. of N-(p-isopropenyl-phenyl)-stearoylamide, 226.5 g. of methyl anthranilate and 7 g. of a montmorillonite catalyst are heated at 170–180° C. for 6 hours. After suction filtration of the catalyst, the excess of methyl anthranilate is distilled off under vacuum.

Raw product: 71 g. (86% of the theoretical yield.

After recrystallisation from ligroin/active carbon colorless crystals having a melting point of 67–68° C. are obtained.

Analysis: $C_{35}H_{54}N_2O_3$ (550.80). Calculated: C, 76.32; H, 9.88; N, 5.09. Found: C, 76.0–76.2; H, 10.10; N, 5.43–5.51.

The NMR spectrum confirms the structure.

EXAMPLE 2

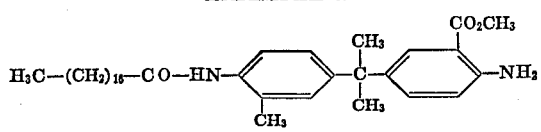

2-[4-stearoylamido)-3-methoxy-phenyl]-2-[4-amino-3-methoxy-carbonylphenyl]-propane 103.5 g. of N-(p-isopropenyl-o-methyl-phenyl)-stearoyl amide, 378 g. of methyl anthranilate and 12 g. of the catalyst according to Example 1 are heated at 174–180° C. for 6 hours. After suction filtration of the catalyst, the excess of methyl anthranilate is distilled off under vacuum.

Raw product: 132.9 g. (94% of the theoretical yield).
After recrystallisation from ligroin, the yellow powder has a melting point of 46 to 47° C.
Analysis: $C_{36}H_{56}N_2O_3$ (564.82). Calculated: C, 76.55; H, 9.99; N, 4.96. Found: C, 76.70–76.90; H, 9.84; N, 4.92–5.04.

EXAMPLE 3

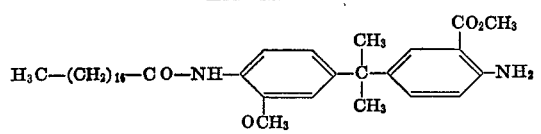

2-[4-stearoylamido)-3-methoxy-phenyl]-2-amino-3-methoxy-carbonyl-phenyl]-propane 69 g. of N-(p-isopropenyl-o-methoxy-phenyl)-stearoyl amide, 242 g. of methyl anthranilate and 8 g. of the catalyst according to Example 1 are heated at 170–178° C. for 6 hours. After suction filtration of the catalyst, the excess of methyl anthranilate is distilled off under vacuum.

Raw product: 84 g. (90% of the theoretical yield).
After recrystallisation the yellow powder has a melting point of 75–79° C.
Analysis: $C_{36}H_{56}N_2O_4$ (580.82). Calculated: C, 74.44; H, 9.72; N, 4.82. Found: C, 74.30–74.60; H, 9.68; N, 4.58–4.73.

EXAMPLE 4

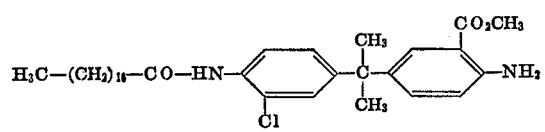

2-[4-stearoylamido)-3-chlor-phenyl]-2-[4-amino-3-methoxy-carbonyl-phenyl]-propane 170 g. of N-(p-isopropenyl-o-chlor-phenyl)-stearoyl-amide, 530 g. of methyl anthranilate and 15 g. of the catalyst according to Example 1 are heated at 174–178° C. for 8 hours. After suction filtration of the catalyst, the excess of methyl anthranilate is distilled off under vacuum.

Raw product: 224 g. (quantitative).
After recrystallisation from petroleum ether, the colorless crystals have a melting point of 71–73° C.
Analysis: $C_{35}H_{53}ClN_2O_3$ (585.26). Calculated: Cl, 6.06. Found: Cl, 5.95–6.11.

EXAMPLE 5

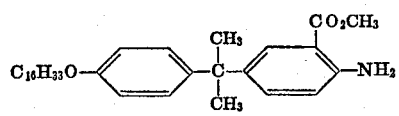

2-(4-cetoxyphenyl)-2-(4-amino-3-methoxycarbonyl-phenyl)-propane 210 g. of dimeric p-cetoxy-isopropenyl benzene which can be produced by reaction of isopropenyl phenol and cetyl bromide according to known process, 600 g. of methyl anthranilate and 25 g. of the catalyst according to Example 1 are heated under a nitrogen atmosphere at 225° C. for 30 minutes. The warm reaction mixture is filtered with suction and the excess of methyl anthranilate is distilled off under vacuum. The residue is mixed with petroleum ether, cooled and filtered under suction.

Yield: 160 g. Melting point: 70° C.

EXAMPLE 6

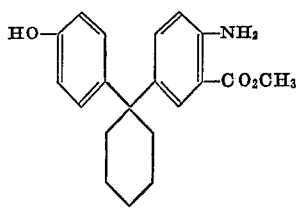

1-(4-hydroxy-phenyl)-1-(4-amino-3-methoxycarbonyl-phenyl)-cyclohexane 110 g. of p-cyclohexenylphenol, 950 g. of methyl anthranilate, 10 g. of the catalyst according to Example 1 and 70 ml. of xylene are heated for 6 hours under reflux. The warm reaction mixture is filtered under suction and the excess of methyl anthranilate is distilled off under vacuum. The residue is mixed with ether cooled and filtered under suction.

The light yellow crystals have a melting point of 200 to 201° C.
Analysis: $C_{20}H_{23}NO_3$ (325.39). Calculated: C, 73.82; H, 7.12; N, 4.30. Found: C, 73.10–73.40; H, 7.01; N, 4.07–4.33.

EXAMPLE 7

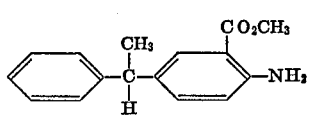

1-(phenyl)-1-(4-amino-3-methoxycarbonyl-phenyl)-ethane 52 g. of styrene, 755 g. methyl anthranilate, 10 g. of the catalyst according to Example 1 and 200 ml. of xylene are reacted as in Example 3. After distilling off the excess of methyl anthranilate, the residue is distilled under high vacuum.

Melting point (0.7 torr): 171–175° C.
Yield: 84 g. (66% of the theoretical yield).
Analysis: $C_{16}H_{17}NO_2$ (255.30). Calculated: C, 75.27; H, 6.71; N, 5.49. Found: C, 75.40; H, 6.55; N, 5.30–5.56.

EXAMPLE 8

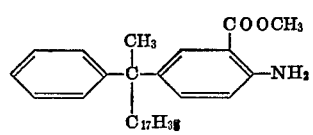

2-phenyl-2-[4-amino-3-methoxy-carbonylphenyl]-nonadecane 5 mol of methyl anthranilate and 1 mol phenyl-methyl-heptadecyl-carbinol which can be obtained by the Grignard's reaction of phenyl heptadecyl ketone and 1 l. xylene are heated at 190° C. in the presence of 30 g. of the catalyst according to Example 1. The water formed by the reaction is distilled off together with the xylene. After 2 hours the excess of the methyl anthranilate is distilled off under vacuum and the residue is treated with methanol after some time, crystals are precipitated. A quick purification can be effected by a columnar chromatograph (silica gel, mobile phase: chloroform). The colorless crystals have the melting point of 73° C.

Calculated: C, 80.3%; H, 10.3%; N, 2.8%. Found: C, 79.9%; H, 10.6%; N, 3.0%.

EXAMPLE 9

The example confirms the excellent stabilisation of viscosity when the compounds according to this invention are incorporated into polyamides. For this purpose the compound produced according to Example 1 is added to monomeric caprolactam which after that is polymerised. The relative viscosity was determined in a solution of m-cresol which contains 1 g. of caprolactam dissolved in 100 ml. of m-cresol.

| Percent weight of the compound of Example 1: | Relative viscosity |
|---|---|
| 0 | 4.93 |
| 0.1 | 3.95 |
| 1.0 | 3.37 |
| 3.0 | 2.41 |

EXAMPLE 10

194 g. (1 mol) of α,α'-dihydroxy-1,4-diisopropylbenzene, 1510 g. (10 mol) of methylanthranilate, 200 ml. of xylene and 10 g. of K 20 (montmorillonite catalyst of Südchemie, Munich) are heated under a nitrogen atmosphere at 116° C. to 190° C. for 3 to 4 hours with stirring. The water of reaction (36 ml., i.e., 100% of the calculated amount) distils off azeotropically in the process. Stirring is then continued for about one hour at about 190° C., the catalyst is removed from the still hot reaction solution by suction filtration, and after removal of xylene and about 500 g. of methyl anthranilate by evaporation, the reaction mixture is left to cool. When cool, the crystal paste is digested with about 400 ml. of ligroin, filtered under suction and dried. 422 g. of α,α'-bis-(4-amino-3-carbomethoxy-phenyl) - 1,4-diisopropylbenzene, i.e. 91.5% of the theoretical yield are obtained. After recrystallisation from toluene, the colourless crystals have a melting point of 218 to 219° C.

Analysis: $C_{28}H_{32}N_2O_4$ (460.55). Calculated: C, 73.02; H, 7.00; N, 6.08. Found: C, 73.30–73.40; H, 7.01–7.04; N, 5.96–6.09.

IR and NMR spectra confirm the structure.

EXAMPLE 11

194 g. (1 mol) of α,α'-dihydroxy-1,4-diisopropylbenzene, 755 g. (5 mol) of methyl anthranilate, 200 ml. of xylene and 10 g. of K 20 (montmorillonite catalyst of Südchemie, Munich) are reacted as in Example 1. After removal of the catalyst by suction filtration and when the reaction solution is cold, the product is digested with about 400 ml. of ethanol, filtered under suction and dried. 351 g. of α,α'-bis-(4-amino-3-carbomethoxy-phenyl-1,4-diisopropylbenzene are obtained (76.5% of the theory). Recrystallisation is carried out as in Example 1. Melting point: 216° C.–219° C.

EXAMPLE 12

158 g. (1 mol) of 1,4-diisopropenylbenzene, 755 g. (5 mol) of methyl anthranilate and 10 g. of K 20 (montmorillonite catalyst of Südchemie, Munich) are heated to 190° C.–200° C. under a nitrogen atmosphere in the course of 6 hours with stirring. When the reaction solution has been obtained, it is digested with about 500 ml. of methanol, filtered under suction and dried. 376 g. of α,α'-bis-(4-amino - 3 - carbomethoxyphenyl)-1,4-diisopropylbenzene, which is 81.5% of the theoretical amount, are obtained in addition to 10 g. of K 20. Recrystallisation is carried out as in Example 1. Melting point 213° C. to 215° C.

EXAMPLE 13

194 g. (1 mol) of α,α'-dihydroxy-1,3-diisopropylbenzene, 755 g. (5 mol) of methylanthranilate, 10 g. of K 20 (montmorillonite catalyst of Südchemie, Munich) and 200 ml. of xylene are heated to 127° C.–195° C. under a nitrogen atmosphere with stirring in the course of 105 minutes. 36 ml. of water of reaction distil off azeotropically in the process. After removal of the catalyst, xylene and about 450 g. of methyl anthranilate are distilled off under vacuum from the reaction solution. A solution of 300 ml. of benzene and 300 ml. of ligroin is then added to the residue. The crystalline paste is removed by suction filtration after some hours and recrystallised from ethanol. 178 g. of colourless crystals of melting point 143° C.–145° C. are obtained. This amounts to 39% of the theoretical quantity of α,α'-bis-(4-amino-3-carbomethoxyphenyl)-1,3-diisopropylbenzene.

Analysis: $C_{28}H_{32}N_2O_4$ (460.55). Calculated: C, 73.02; H, 7.00; N, 6.08. Found: C, 73.30; H, 6.95; N, 5.99–6.22.

The structure is confirmed by the IR and NMR spectra.

EXAMPLE 14

134.2 g. (1 mol) of p-hydroxy-isopropenylbenzene, 1510 g. (10 mol) of methylanthranilate, 400 ml. of xylene and 10 g. of K 20 (montmorillonite catalyst of Südchemie, Munich) are heated to 157° C.–172° C. under a nitrogen atmosphere for 3 hours with stirring. After removal of the catalyst, xylene and about 1.3 kg. of methylanthranilate are distilled off from the reaction solution under vacuum. The residue is then digested with 1 l. of ligroin. It is then filtered under suction, dried and recrystallised from toluene. 209 g. of crystals of melting point 147° C. to 149° C. are obtained, amounting to 73% of the theoretical quantity of 2,2'-(4-hydroxyphenyl)-(3 - carbomethoxy-4-aminophenyl)-propane.

Analysis: $C_{17}H_{19}NO_3$ (285.33). Calculated: C, 71.56; H, 6.71; N, 4.91. Found: C, 71.60–71.90; H, 6.73; N, 4.89–5.08.

EXAMPLE 15

59 g. (0.5 mol) of isopropenylbenzene, 755 g. (5 mol) of methyl anthranilate, 200 ml. of xylene and 10 g. of K 20 are heated to 182° C.–187° C. under a nitrogen atmosphere with stirring for 5 minutes. After removal of the catalyst, xylene and excess methyl anthranilate are distilled from the reaction solution. The residue (141 g.) is digested with a solution of 500 ml. of ligroin and 10 ml. of benzene. It is then filtered under suction, dried and recrystallised from cyclohexane. 97 g. of crystals of melting point 93° C. are obtained, amounting to 72% of the theoretical quantity of 2,2'-(phenyl)-(3-carbomethoxy-4-aminophenyl)-propane.

Analysis: $C_{17}H_{19}NO_2$ (269.33). Calculated: C, 75.81; H, 7.11; N, 5.20. Found: C, 76.20–76.30; H, 6.97; N, 5.15–5.27.

EXAMPLE 16

22.88 g. (0.04975 mol) of α,α'-bis(4-amino-3-carbomethoxyphenyl)-1,4-diisopropylbenzene are suspended in 300 ml. of absolute chloroform. A solution of 10.1 g. (0.04975 mol) of isophthalic acid dichloride in 70 ml. of absolute chloroform is then added dropwise at 25° C. in the course of 28 minutes with stirring. A solution is formed in the process, to which a solution of 4.4 g. (0.11 mol) of sodium hydroxide in 200 ml. of water is then added dropwise in the course of 42 minutes. The reaction is left to continue for 2½ hours and the reaction mixture is then neutralised with dilute acetic acid and the organic phase is separated off. This organic phase is washed with water, dried with $CaCl_2$ and concentrated by evaporation to a highly viscous solution from which the polyamide ester films can be cast.

A sample was precipitated with methanol and analysed.
Analysis: $(C_{36}H_{34}N_2O_6)_n$. Calculated: C, 73.20; H, 5.80; N, 4.74. Found: C, 72.60–72.80; H, 5.87–5.92; N, 4.64–4.76.

The IR spectrum confirms the structure.

Cyclisation of the polyamidoester (in the form of a film) into polybenzoxazinone is effected by heating for 6 hours at 220° C. to 250° C. under vacuum.

We claim:
1. Anthranilic acid ester of the formula

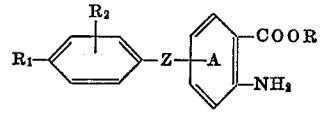

in which
R is $C_1$–$C_4$ alkyl or phenyl;

$R_1$ is hydrogen, OH, $C_1$–$C_{18}$-alkoxy or NH—CO—($C_1$–$C_{17}$-alkyl);

$R_2$ is hydrogen, $C_1$–$C_{18}$-alkyl, $C_1$–$C_{18}$-alkoxy or halogen;

Z is in o- or p-position to the amino group of the nucleus A and is

$R_4$ is $C_1$–$C_{18}$-alkyl; and $R_5$ is hydrogen, $C_1$–$C_4$-alkyl or phenyl; or $R_4$ and $R_5$ together with the C-atom to which they are attached are a 5- or 6-member cycloaliphatic ring.

2. Anthranilic acid ester of Claim 1 having the formula

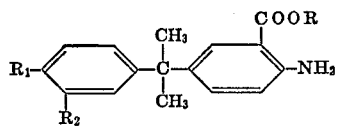

in which

R is $C_1$–$C_4$-alkyl or phenyl;

$R_1$ is $C_1$–$C_{18}$-alkoxy or NH—CO— ($C_1$–$C_{17}$-alkyl); and $R_2$ is hydrogen, $C_1$–$C_{18}$-alkyl, $C_1$–$C_{18}$-alkoxy, or halogen.

3. Anthranilic acid ester of Claim 1 having the formula

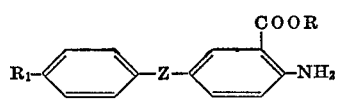

in which

R is $C_1$–$C_4$-alkyl or phenyl;

$R_1$ is hydrogen or OH; and

Z is

$R_4$ is $C_1$–$C_{18}$-alkyl; and $R_5$ is hydrogen, $C_1$–$C_4$-alkyl or phenyl; or $R_4$ and $R_5$ together with a C-atom to which they are attached are a 5- or 6-membered cycloaliphatic ring.

4. Anthranilic acid ester having the formula

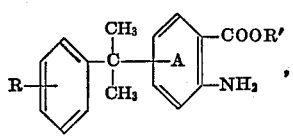

in which R is hydrogen, OH, Cl, Br, methyl, isopropyl or

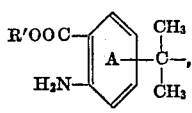

R' is $C_1$–$C_4$ alkyl, isoamyl or phenyl; and R and the isopropylidene group are in the meta- or para-position to each other; and where R is

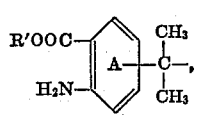

both isopropylidene groups are linked to the nucleus A in the ortho- or para-position to the amino group.

5. Anthranilic acid esters having the formula

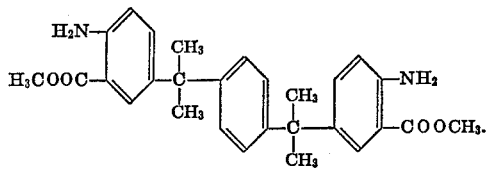

6. Anthranilic acid ester having the formula

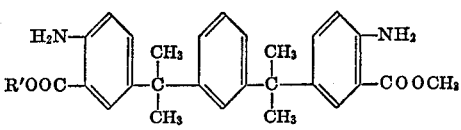

in which R' is $C_1$–$C_4$-alkyl or phenyl.

7. A process for the production of a nuclearly substituted anthranilic acid ester which comprises reacting an anthranilic acid ester of the formula

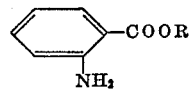

wherein

R is $C_1$–$C_4$ or phenyl;

with a compound of the formula

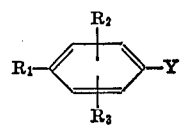

wherein

Y is α-hydroxyisopropyl, isopropenyl, α-haloisopropyl, α-alkoxyisopropyl,

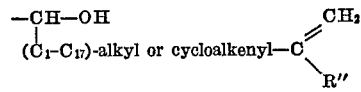

R'' is hydrogen, $C_1$–$C_4$-alkyl or aryl;

$R_1$ is hydrogen, methyl, isopropyl, halogen, OH, $C_1$–$C_{18}$-alkoxy, NH—CO— ($C_1$–$C_{17}$-alkyl), isopropenyl, α-hydroxyisopropyl, α-haloisopropyl, or α-alkoxyisopropyl; and $R_2$ and $R_3$ are the same or different and are hydrogen, $C_1$–$C_{18}$-alkyl, alkoxy or halogen; with the proviso that where $R_1$ is α-hydroxyisopropyl, isopropenyl, α-haloisopropyl or α-alkoxyisopropyl, $R_2$ and $R_3$ are hydrogen; said reaction being effected in the presence of alumina activated with mineral acids at a temperature of 100–235° C.

8. The process of Claim 7 in which the reaction is carried out at a temperature of 140–190° C.

9. The process of Claim 7 in which the molar ratio of said compound of the formula

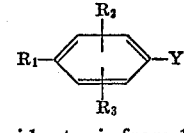

to said anthranilic acid ester is from 1:3 to 1:10.

References Cited

UNITED STATES PATENTS 3,413,339  11/1968  Scherrer _____ 260—471 R

LORRAINE A. WEINBERGER, Primary Examiner

L. A. THAXTON, Assistant Examiner

U.S. Cl. X.R.

260—390, 404.5.

UNITED STATES PATENT OFFICE
CERTIFICATE OF CORRECTION

PATENT NO. : 3,829,462

DATED : August 13, 1974

INVENTOR(S) : Heinrich Krimm et al

It is certified that error appears in the above-identified patent and that said Letters Patent are hereby corrected as shown below:

Column 1, line 34 "additional" should read ---additionally---.

Column 1, line 69, "1.2-dibromo ethane" should be ---dibromo-ethane---.

Column 3, line 57, "both be" should be ---be both---.

Column 4, line 10, "- p - isopropenylbenzene," should be --- -p-isopropenylbenzene,---.

Column 4, line 18, " - stearyl" should read ---stearyl---.

Column 4, line 22, "Patent 1,191,363)-and" should be ---Patent 1,191,363)-; and---.

Column 4, line 71 "te" should be ---the---.

Column 5, line 21, "J. Polymer Sci.," should be ---(J. Polymer Sci.,---.

Column 5, line 67, "0.7 1." should be ---0.7 1 ---.

Column 6, line 31, "N,8.36" should be ---N 8.36---.

Column 6, line 31, "N,8.22 to 8.43" should be ---N 8.22 to 8.43---

Column 6, line 68, "theoretical yield." should be ---theoretical yield).---

UNITED STATES PATENT OFFICE
CERTIFICATE OF CORRECTION

PATENT NO. 3,829,462                                       Page 2

DATED    August 13, 1974

INVENTOR(S) Heinrich Krimm et al

It is certified that error appears in the above-identified patent and that said Letters Patent are hereby corrected as shown below:

Column 7, Example 2, line 7, "-3-methoxy" first occurrence should be -- -3- methyl --.

Column 7, line 71, after "to" insert ---a---.

Column 7, Example 3, line 27, "-2-amino-" should read --- -2-[4-amino- ---.

Column 8, Example 9, line 70, "The" should be ---This---.

Column 9, line 4, Title "Percent weight" should be ---Percent by Weight ---.

Column 9, line 22, "cool" second occurrence should be -- cold --.

Signed and Sealed this fifth Day of August 1975

[SEAL]

Attest:

RUTH C. MASON  
Attesting Officer

C. MARSHALL DANN  
Commissioner of Patents and Trademarks